J. C. HILBURN.
SAW DRESSING AND GAGING TOOL.
APPLICATION FILED JAN. 29, 1921.

1,420,547.

Patented June 20, 1922.
2 SHEETS—SHEET 1.

J. C. Hilburn, Inventor

By C. A. Snow & Co.
Attorneys

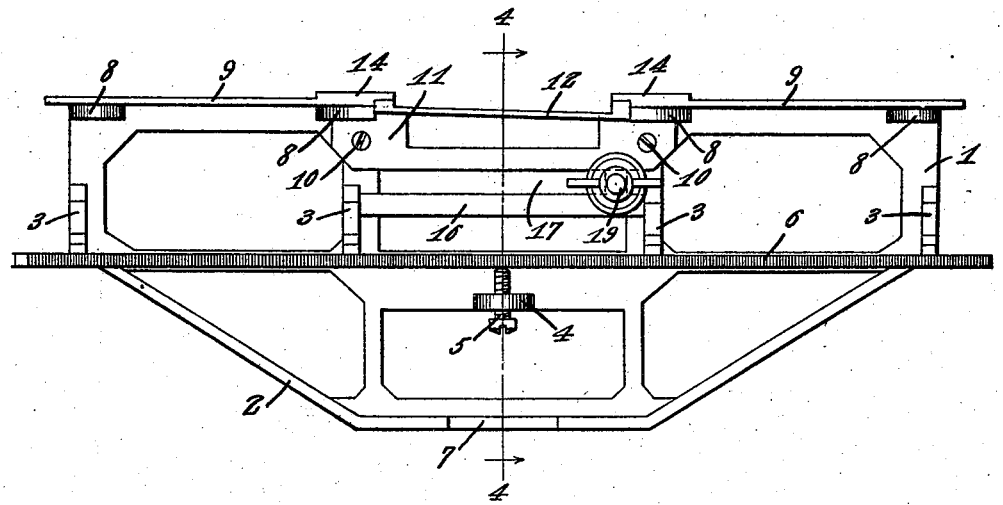
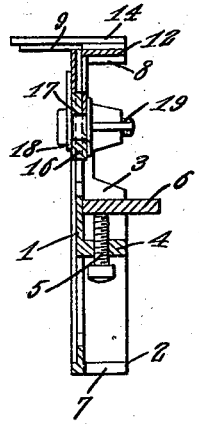

UNITED STATES PATENT OFFICE.

JAMES CLARENCE HILBURN, OF THORNBURG, ARKANSAS.

SAW DRESSING AND GAGING TOOL.

1,420,547. Specification of Letters Patent. Patented June 20, 1922.

Application filed January 29, 1921. Serial No. 440,974.

*To all whom it may concern:*

Be it known that I, JAMES C. HILBURN, a citizen of the United States, residing at Thornburg, in the county of Perry and State of Arkansas, have invented a new and useful Saw Dressing and Gaging Tool, of which the following is a specification.

The device forming the subject matter of this application is a tool, adapted to be used for filing and adjusting the teeth of a cross cut saw, and one object of the invention is to provide novel means whereby the raker teeth may be cut long or short, at the will of an operator.

Another object of the invention is to improve generally and to enhance the utility of devices of that type to which the invention appertains.

In the accompanying drawings:—

Figure 3 is an elevation wherein the opposite side of the device is shown from that which appears in Figure 1; and Figure 4 is a cross section on the line 4—4 of Figure 3.

Figure 1:
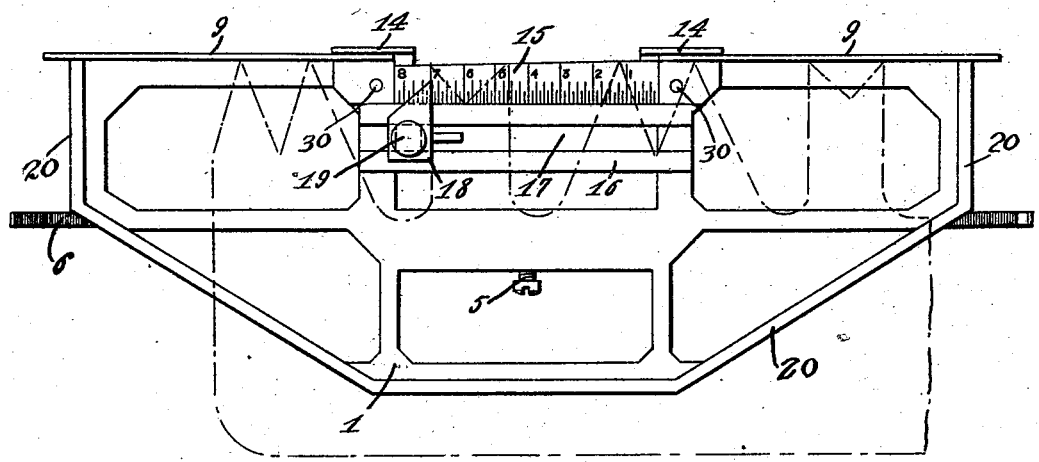
Figure 1 shows in side elevation, a device constructed in accordance with the invention.
Figure 2:
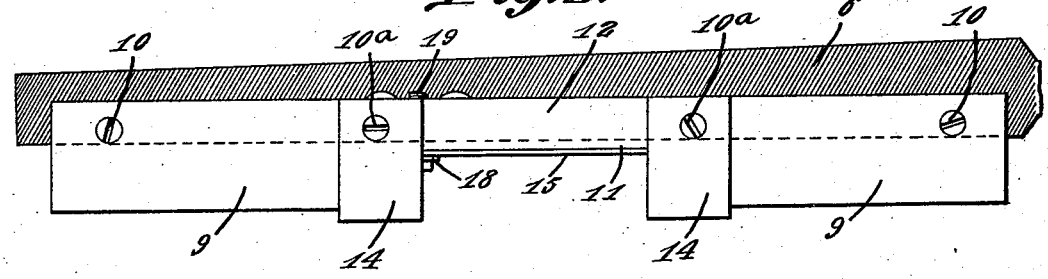
Figure 2 is a top plan.

In carrying out the invention there is provided a plate or body 1 supplied upon one side with an outwardly projecting flange 2 and provided on its opposite side with a reinforcing bead 20. Brackets 3 extend outwardly from the body 1, the body having an outwardly extended ear 4, into which a set screw 5 is threaded. A file 6 is placed against the brackets 3 and is held in place by a set screw 5. The flange 2 is supplied with a notch 7, so that a screw driver can be used conveniently to manipulate the set screw 5. When the file is held as above described, the tool may be used to dress down the ends of the teeth of a saw, in a manner well understood by sawyers.

The plate 1 is equipped with outwardly extending lugs 8 on which plates 9 are mounted, the plates 9 being held in place by screws 10 and 10ª. The plates 9 form an abutment, since the teeth of a saw are placed thereagainst during an operation which will be described hereinafter.

The numeral 11 denotes an angle bar fitting against the plate or body 1 and extended beneath the innermost lugs 8, the angle bar 11 being held in place by screws 30. The angle bar 11 includes an outwardly extended flange 12 which fits between the innermost lugs 8. The plates 9 have thickened extensions 14 which overhang the flange 12 at its ends. The flange 12 constitutes a file rest, and it is to be noted that this flange is not parallel to the plates or abutments 9. Thus, assuming that the tool is in the position shown in Figure 3, one end of the flange 12 is 1/32 of an inch (more or less) lower than the other end of the flange.

The numeral 15 denotes a scale held on the plate 1 by the screws 30. The plate or body 1 carries a bar 16, which, with one edge of the angle bar 11, forms a slot 17. A slide 18 is mounted to move along the angle bar 11 and along the bar 16, and is pointed to co-operate with the scale 15. A bolt and wing nut 19 are connected to the slide 18 and operate in the slot 17, the bolt and wing nut forming a clamping device, whereby the slide 18 may be held in any desired position.

Suppose that a saw is placed against the plate 1, the ends of the teeth of the saw being in engagement with the lower surface of the plates 9. One of the raker teeth of the saw will project above the flange 12, because the flange is below the plates 9 and is not parallel thereto. The further that the saw is moved to the left (Figure 1), the more will the tooth extend above the flange 12. The position of the tooth, and, consequently, the amount that the tooth extends above the flange 12, may be regulated by placing one edge of the tooth against the edge of the slide 18, the slide being held in adjusted position by the bolt and wing nut 19, and the position of the slide being determined by noting the particular mark of the scale 15 wherewith the point of the slide coacts. It is clear that if a file is reciprocated on the flange 12, so much of the tooth as projects beyond the flange, will be cut off, as indicated by the dotted line showing in Figure 1, and that more or less of the tooth may be removed at the will of an operator.

Although the figures given below are arbitrary, if the flange 12 has a slope of 1/32 of an inch, and if there are sixty-four marks on the scale 15, an adjustment of approximately 0.002 of an inch in the length of the raker tooth may be secured, since $$1/32 \times 1/64 = 1/2048$$

Having thus described the invention, what is claimed is:

1. A tool for dressing saw teeth, comprising a tooth abutment; a file rest disposed at an acute angle to the abutment; and a slide adjustable longitudinally of the rest, the slide being adapted to engage one side of a saw tooth to regulate the amount which said tooth projects beyond the file rest.

2. A tool for dressing saw teeth, comprising a tooth abutment; a file rest disposed at an acute angle to the abutment; a scale extended longitutinally of the file rest; and a slide adjustable longitudinally of the scale and the rest, the slide being adapted to engage one side of a saw tooth to regulate the amount which said tooth projects beyond the file rest, and constituting an indicator cooperating with the scale.

3. A tool for dressing saw teeth, comprising a body having lateral flanges; a file rest mounted on the frame between the flanges and disposed at an acute angle to the flanges; a scale on the frame and extended longitudinally of the file rest; a slide movable on the frame longitudinally of the file rest and constituting an indicator cooperating with the scale; and means for clamping the slide to the frame in adjusted positions longitudinally of the scale, the slide being adapted to engage one side of a saw tooth to regulate the amount which said tooth projects beyond the file rest.

In testimony that I claim the foregoing as my own, I have hereto affixed my signature in the presence of two witnesses.

JAMES CLARENCE HILBURN.

Witnesses:
 HALL SMITH,
 B. L. MEYERS.